(12) United States Patent
Cho et al.

(10) Patent No.: US 12,086,712 B2
(45) Date of Patent: Sep. 10, 2024

(54) IMAGE SEGMENTATION METHOD AND SYSTEM USING GAN ARCHITECTURE

(71) Applicant: Korea Electronics Technology Institute, Seongnam-si (KR)

(72) Inventors: Choong Sang Cho, Seongnam-si (KR); Young Han Lee, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 401 days.

(21) Appl. No.: 17/512,463

(22) Filed: Oct. 27, 2021

(65) Prior Publication Data
US 2022/0383104 A1 Dec. 1, 2022

(30) Foreign Application Priority Data
May 31, 2021 (KR) .......... 10-2021-0070084

(51) Int. Cl.
*G06T 7/11* (2017.01)
*G06F 18/21* (2023.01)
*G06N 3/045* (2023.01)
*G06N 3/08* (2023.01)
*G06V 10/75* (2022.01)

(52) U.S. Cl.
CPC .......... *G06N 3/08* (2013.01); *G06F 18/2163* (2023.01); *G06F 18/217* (2023.01); *G06N 3/045* (2023.01); *G06T 7/11* (2017.01); *G06V 10/751* (2022.01); *G06T 2207/20081* (2013.01); *G06T 2207/20084* (2013.01)

(58) Field of Classification Search
CPC .......... G06T 7/11; G06N 3/08; G06V 10/751
See application file for complete search history.

(56) References Cited

U.S. PATENT DOCUMENTS

| | | | |
|---|---|---|---|
| 2020/0043475 A1* | 2/2020 | Nguyen | G10L 15/04 |
| 2020/0074185 A1* | 3/2020 | Rhodes | G06N 3/047 |
| 2021/0125320 A1* | 4/2021 | Kim | G06N 20/20 |
| 2022/0198775 A1* | 6/2022 | Yuan | G06V 10/25 |

* cited by examiner

*Primary Examiner* — Sam Bhattacharya
(74) *Attorney, Agent, or Firm* — Hauptman Ham, LLP (57) ABSTRACT

There are provided a method and a system for image segmentation utilizing a GAN architecture. A method for training an image segmentation network according to an embodiment includes: inputting an image to a first network which is trained to output a region segmentation result regarding an input image, and generating a region segmentation result; and inputting the region segmentation result generated at the generation step and a ground truth (GT) to a second network, and acquiring a discrimination result, the second network being trained to discriminate inputted region segmentation results as a result generated by the first network and a GT, respectively; and training the first network and the second network by using the discrimination result. Accordingly, region segmentation performance of a semantic segmentation network regarding various images can be enhanced, and a very small image region can be exactly segmented.

11 Claims, 6 Drawing Sheets

$\alpha \times$ [Adversarial Loss] $+ \beta \times$ [Segmentation Performance Loss] $+ \gamma \times$ [Content Loss]

IMAGE SEGMENTATION METHOD AND SYSTEM USING GAN ARCHITECTURE

CROSS-REFERENCE TO RELATED APPLICATION(S) AND CLAIM OF PRIORITY

This application is based on and claims priority under 35 U.S.C. § 119 to Korean Patent Application No. 10-2021-0070084, filed on May 31, 2021, in the Korean Intellectual Property Office, the disclosure of which is herein incorporated by reference in its entirety.

BACKGROUND

Field

The present disclosure relates generally to image segmentation technology, and more particularly, to a method and a system for automatically segmenting regions in an input image by using artificial intelligence (AI) technology.

Description of Related Art

Image segmentation refers to technology for automatically segmenting a region that a user wants to find in an image. In the medical image field, image segmentation is mostly utilized to give assistance to diagnosis by medical doctors, and is widely used in aviation images or closed-circuit television (CC-TV) images.

The development of AI technology has changed the paradigm of past image segmentation, which is based on image processing algorithms. That is, currently, image segmentation that utilizes deep learning networks is a growing trend.

However, there are limits to enhancing performance of image segmentation through learning by a currently suggested deep learning network, and there is a demand for an approach of a new method of passing the limits.

SUMMARY

To address the above-discussed deficiencies of the prior art, it is a primary object of the present disclosure to provide a method and a system for image segmentation, which train a network by utilizing a generative adversarial network (GAN) architecture, as a method for enhancing image segmentation performance of a semantic segmentation network.

According to an embodiment of the present disclosure to achieve the above-described object, a method for training an image segmentation network includes: inputting an image to a first network which is trained to output a region segmentation result regarding an input image, and generating a region segmentation result; and inputting the region segmentation result generated at the generation step and a ground truth (GT) to a second network, and acquiring a discrimination result, the second network being trained to discriminate inputted region segmentation results as a result generated by the first network and a GT, respectively; training the first network by using the discrimination result; and training the second network by using the discrimination result.

The first network may be trained by using a loss function including discrimination performance of the second network.

The first network may be trained by using the loss function further including segmentation performance of the first network.

The segmentation performance of the first network may be calculated by comparing the region segmentation result generated by the first network and the GT.

The first network may be trained by using the loss function further including region segmentation image generation performance of the first network.

The region segmentation image generation performance of the first network may be calculated by comparing an input image to which the region segmentation result generated by the first network is added, and an input image to which the GT is added.

In the loss function, respective weightings may be applied to the discrimination performance of the second network, the segmentation performance of the first network, and the region segmentation image generation performance of the first network.

The second network may be trained by using a loss function including discrimination performance of the second network.

The region segmentation result may be a semantic mask.

According to another embodiment of the present disclosure, a system for training an image segmentation network includes: a processor configured to: input an image to a first network which is trained to output a region segmentation result regarding an input image, and generate a region segmentation result; and input the region segmentation result generated by the first generator and a GT to a second network, and acquire a discrimination result, the second network being trained to discriminate inputted region segmentation results as a result generated by the first network and a GT, respectively; and train the first network and the second network by using the discrimination result; and a storage unit configured to provide a necessary storage space to the processor.

According to still another embodiment of the present disclosure, an image segmentation method includes: receiving an input of an image; and generating a region segmentation result regarding the image inputted at the input step by using a first network, and the first network is trained to output a region segmentation result regarding an input image when an image is inputted, and discrimination performance of a second network is used for training of the first network, and the second network is trained to discriminate inputted region segmentation results as a result generated by the first network and a GT, respectively, when the region segmentation results are inputted.

According to yet another embodiment of the present disclosure, an image segmentation system includes: a processor configured to generate a region segmentation result regarding an inputted image by using a first network, and a storage unit configured to provide a necessary storage space to the processor, and the first network is trained to output a region segmentation result regarding an input image when an image is inputted, and discrimination performance of a second network is used for training of the first network, and the second network is trained to discriminate inputted region segmentation results as a result generated by the first network and a GT, respectively, when the region segmentation results are inputted.

According to embodiments of the present disclosure as described above, region segmentation performance regarding various images can be enhanced by training a semantic segmentation network by utilizing a GAN architecture, and accordingly, an image region can be exactly segmented.

In addition, according to embodiments of the present disclosure, precise segmentation regions can be exactly segmented.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in more detail with reference to the accompanying drawings.

1. Image Segmentation System

Figure 1:
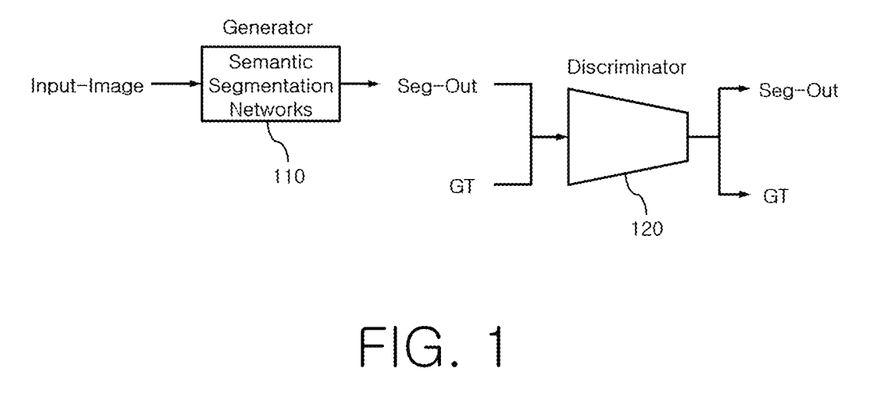
FIG. 1 is a view provided to explain a segmentation-GAN according to an embodiment of the present disclosure.

FIG. 1 is a view provided to explain a segmentation-generative adversarial network (GAN) according to an embodiment of the present disclosure. The segmentation-GAN according to an embodiment is an image segmentation system that utilizes a GAN architecture.

Specifically, a generator of the GAN may be implemented as a 'semantic segmentation network for segmenting a region in an image', instead of a 'network for generating an image', and a discriminator of the GAN may receive a result of segmenting a region by the semantic segmentation network and a ground truth (GT) and may discriminate the same, and the semantic segmentation network may be trained based on discrimination performance and performance of the semantic segmentation network.

To achieve this, the image segmentation system according to an embodiment includes a semantic segmentation network 110 and a discriminator 120 as shown in FIG. 1.

The semantic segmentation network 110 is a network that is trained to segment regions in an input image when an image is inputted, and to output the image. The semantic segmentation network 110 generates a semantic mask regarding the input image, and converts the input image into a semantic mask-added image (semantic labeling image).

Figure 2:
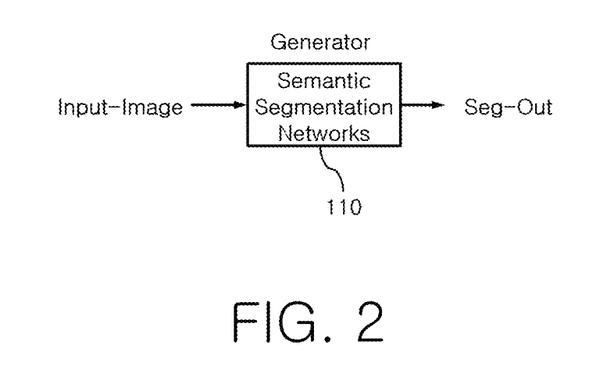
FIG. 2 is a view illustrating a semantic segmentation network.

As shown in FIG. 2, the input to the semantic segmentation network 110 is an image for segmenting regions (Input Image), and the output therefrom is a semantic mask (Seg-Out).

The semantic segmentation network 110 may be implemented by a deep learning-based segmentation network, and embodiments where the semantic segmentation network is implemented by segmentation networks of other structures are not excluded.

The discriminator 120 is a network that is trained to receive the semantic mask (Seg-Out), which is the result of region segmentation outputted from the semantic segmentation network 110, and a GT semantic mask regarding this, and to discriminate (identify) which mask is the mask generated at the semantic segmentation network 110 and which mask is the GT semantic mask.

2. Training of Semantic Segmentation Network

The semantic segmentation network 110 is trained to degrade discrimination performance of the discriminator 120 while enhancing its own region segmenting performance and segmentation image generation performance.

Figure 3:
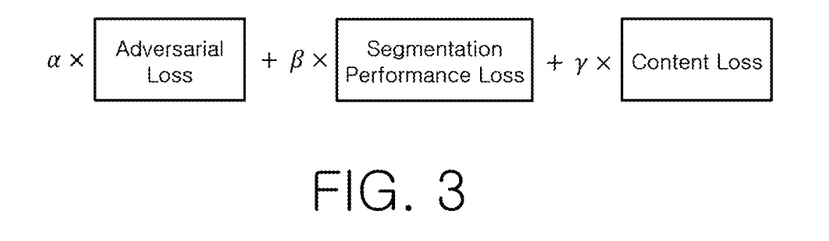
FIG. 3 is a view illustrating a loss function of the semantic segmentation network.
Figure 4:
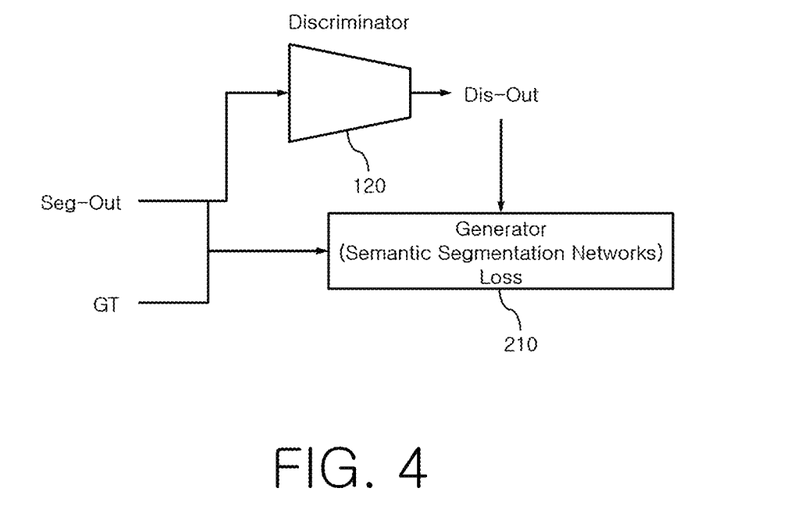
FIG. 4 is a view illustrating a loss generator of the semantic segmentation network.

A loss function of the semantic segmentation network 110 to achieve this is illustrated in FIG. 3, and FIG. 4 illustrates a loss generator 210 for generating a loss of the semantic segmentation network 110 based on the loss function.

As shown in FIG. 3, the loss function of the semantic segmentation network 110 includes 1) an adversarial loss, 2) a segmentation performance loss, and 3) a content loss, and applies settable weights ($\alpha, \beta, \gamma$).

The loss function $L_G$ of the semantic segmentation network 110 may be expressed by the following equation:

$$L_G = \alpha \times E[\log(D(G_{seg}(I)))] +$$
$$\beta \times SegPerformance(SegOut, GT) + \gamma \times ContentLoss(SegOut, GT)$$

where D( ) is the discriminator 120, $G_{seg}$( ) is the semantic segmentation network 110, E is Expectation calculation, SegPerformance( ) is a function for calculating region segmentation performance by comparing masks of two images, and ContentLoss( ) is a function for calculating region segmentation image generation performance by comparing two mask-added images.

In addition, $0 \leq \alpha \leq 1, 0 \leq \beta \leq 1, 0 \leq \gamma \leq 1, \alpha + \beta + \gamma = 1$ 1) Adversarial Loss The adversarial loss is a loss for evaluating discrimination (identification) performance of the discriminator 120 regarding the semantic mask (Seg-Out) and the GT semantic mask. As the discrimination performance of the discriminator 120 is higher, the adversarial loss is greater, and, as the discrimination performance of the discriminator 120 is lower, the adversarial loss is smaller.

As shown in FIG. 4, the loss generator 210 calculates the adversarial loss, based on 1) the semantic mask (Seg-Out)

outputted from the semantic segmentation network 110, 2) the GT semantic mask, and 3) a result of discrimination (Dis-Out) of the discriminator 120.

2) Segmentation Performance Loss

The segmentation performance loss is a loss for evaluating region segmentation performance of the semantic segmentation network 110. As the region segmentation performance of the semantic segmentation network 110 is higher, the segmentation performance loss is smaller, and, as the region segmentation performance is lower, the segmentation performance loss is greater.

The loss generator 210 may calculate the region segmentation performance of the semantic segmentation network 110 by comparing 1) the semantic mask generated at the semantic segmentation network 110 and 2) the GT semantic mask, specifically, by calculating Dice, Intersection over Union (IoU) regarding the two images.

3) Content Loss

The content loss is a loss for evaluating region segmentation image generation performance in the semantic segmentation network 110. As the semantic mask-added image generation performance of the semantic segmentation network 110 is higher, the content loss is smaller, and, as the image generation performance is lower, the content loss is greater.

The loss generator 210 may calculate the region segmentation image generation performance of the semantic segmentation network 110 by comparing 1) an input image to which the semantic mask generated at the semantic segmentation network 110 is added, and 2) an input image to which the GT semantic mask is added, specifically, by calculating similarity between the two images.

The similarity between the two images may be calculated by using the following Norm measurement equation:

$$\|X\|_p = (\Sigma_{i=1}^n |x_i|^p)^{1/p}$$

Figure 5:
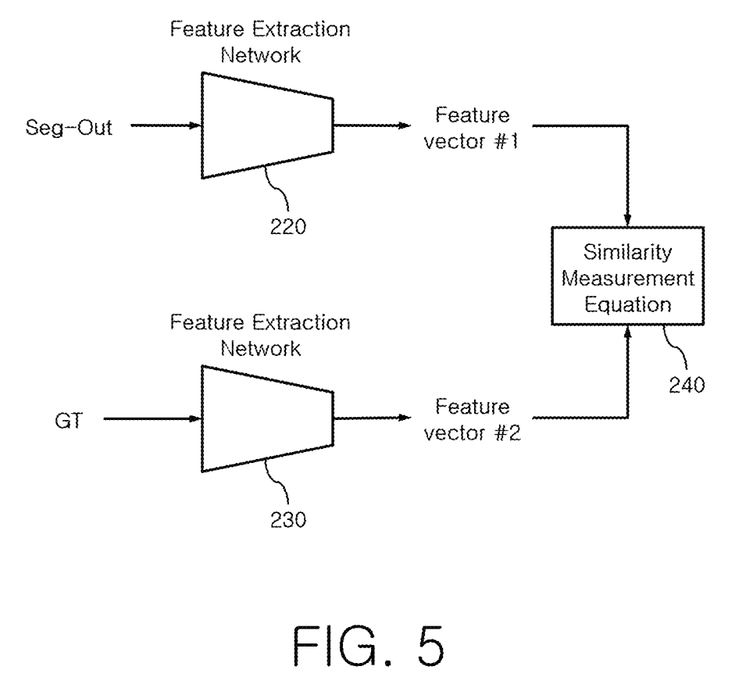
FIG. 5 is a view provided to explain a method for calculating similarity between two images by the loss generator of the semantic segmentation network.

Another method of calculating similarity between the two images is as shown in FIG. 5. Specifically, a feature vector #1 may be extracted from the input image to which the semantic mask is added at a feature extraction network 220, and a feature vector #2 may be extracted from the image to which the GT semantic mask is added at a feature extraction network 230, and then, a similarity measurement device 240 may calculate similarity between the two images by calculating similarity between the feature vector #1 and the feature vector #2 by using a measurement equation.

3. Training of Discriminator

Figure 6:
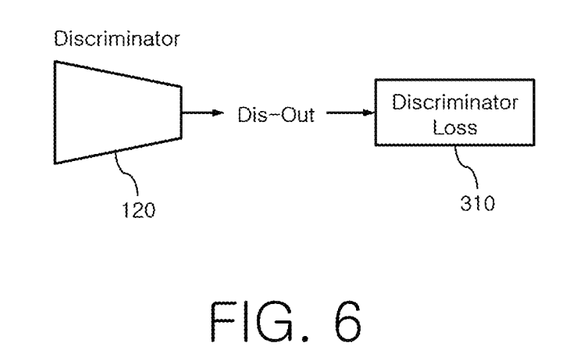
FIG. 6 is a view illustrating a loss generator of a discriminator.

The discriminator 120 is trained to enhance its own discrimination performance. To achieve this, a loss function $L_D$ of the discriminator 120 may be expressed by the following equation:

$$L_D = E[\log(D(M_{GT}))] + E[\log(1 - D(G_{seg}(I)))]$$

where D ( ) is the discriminator 120, $G_{seg}$ ( ) is the semantic segmentation network 110, E is expectation calculation, and $M_{GT}$ is a GT semantic mask.

$L_D$ is a loss for evaluating discrimination (identification) performance of the discriminator 120 regarding the input image to which the semantic mask is added and the input image to which the GT semantic mask is added. As the discrimination performance of the discriminator 120 is higher, $L_D$ is greater, and, as the discrimination performance of the discriminator 120 is lower, $L_D$ is smaller.

FIG. 6 illustrates a loss generator 310 for generating a loss of the discriminator 120, based on the loss function. As shown in the drawing, the loss generator 310 may calculate $L_D$, based on the result of discrimination (Dis-Out) outputted from the discriminator 120.

4. Performance Evaluation

In order to evaluate performance of the segmentation-GAN according to an embodiment, a test was performed by using Inria aerial image data and SpaceNet data.

Figure 7:
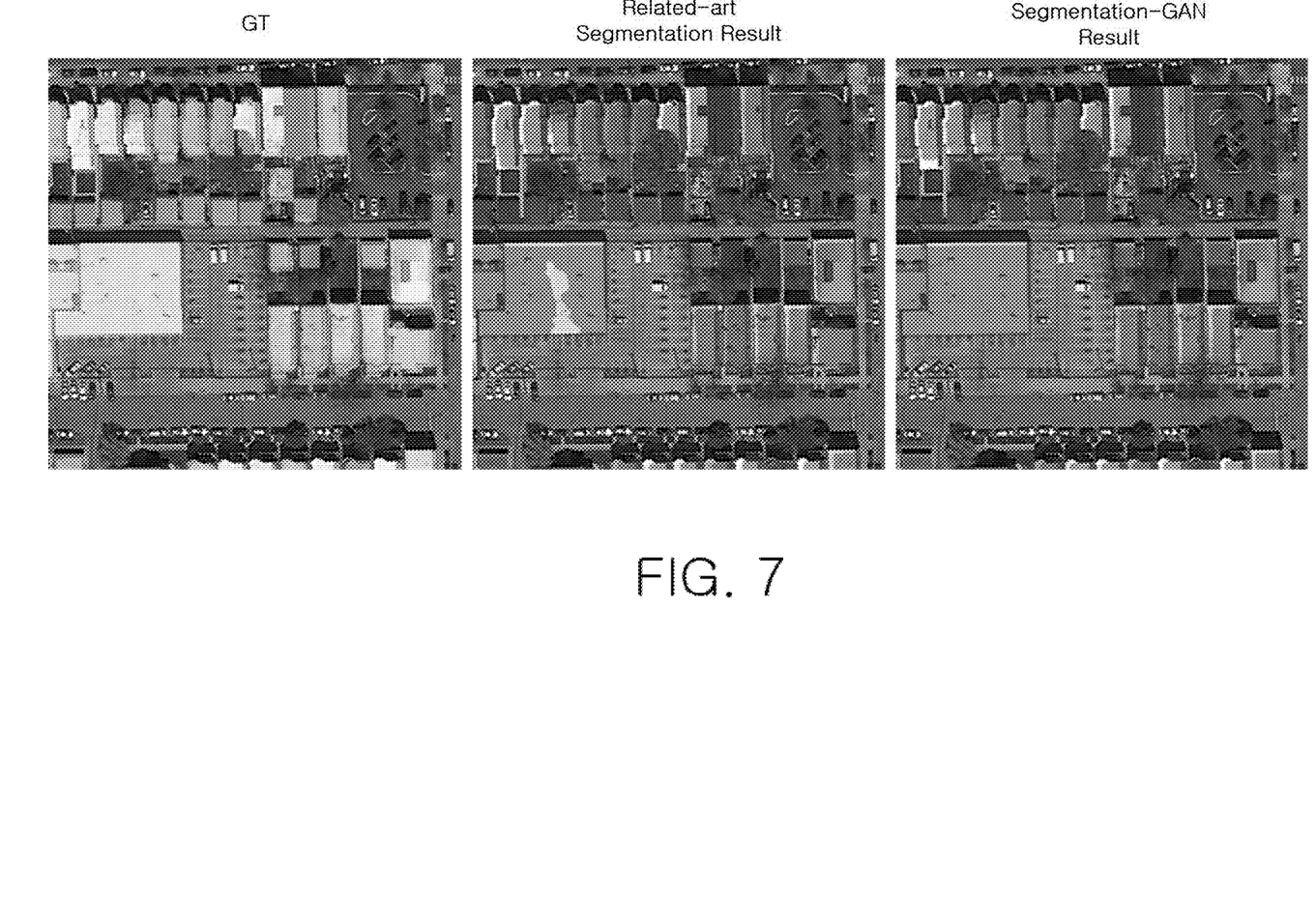
FIG. 7 is view illustrating a result of evaluating performance of the semantic segmentation network.

The left view of FIG. 7 suggests a GT semantic mask, the center view suggests a result of image segmentation by a related-art semantic segmentation network, and the right view suggests a result of image segmentation by the semantic segmentation network 110 which is trained in the segmentation-GAN architecture according to an embodiment.

As shown in FIG. 7, the result of image segmentation according to an embodiment is more similar to the GT semantic mask than the result of image segmentation by the related-art method.

Figure 8:
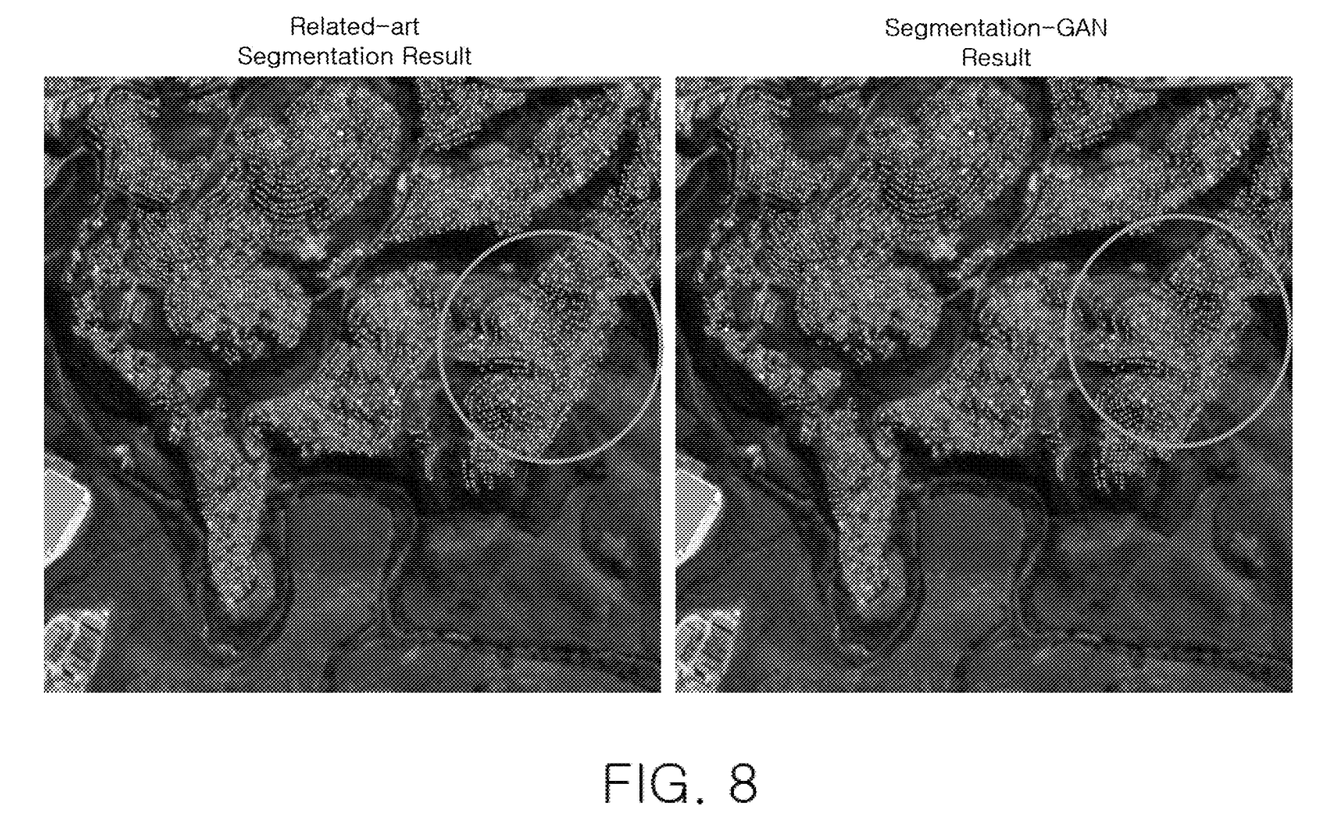
FIG. 8 is a view illustrating a result of evaluating performance of the semantic segmentation network.

The left view of FIG. 8 illustrates overlap of the result of image segmentation by the related-art semantic segmentation network on the GT semantic mask, and the right view illustrates overlap of the result of image segmentation by the semantic segmentation network trained in the segmentation-GAN architecture according to an embodiment, on the GT semantic mask.

Referring to the drawing, specifically, the region illustrated by the blue circle, the related-art method does not segment regions which are the GT semantic mask, whereas the method according to an embodiment well segments most of the regions appearing in the GT image.

5. Hardware Structure of Image Segmentation System

Figure 9:
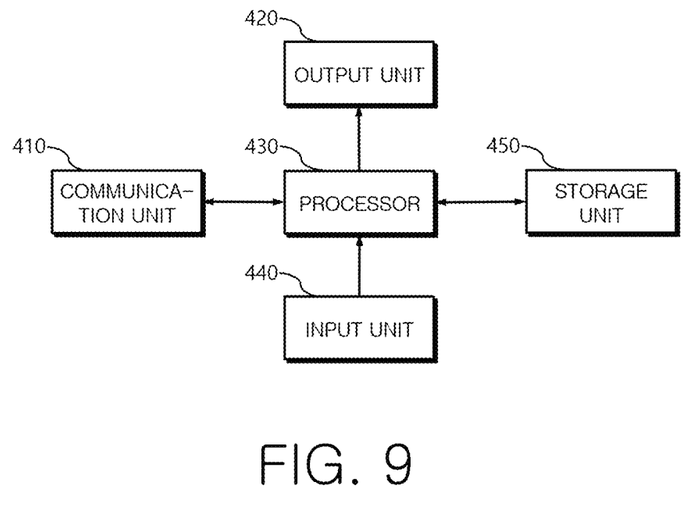
FIG. 9 is a view illustrating a hardware structure of the image segmentation system shown in FIG. 1.

FIG. 9 is a view illustrating a hardware structure of the image segmentation system shown in FIG. 1. As shown in the drawing, the image segmentation system may be implemented by a computing system that includes a communication unit 410, an output unit 420, a processor 430, an input unit 440, and a storage unit 450.

The communication unit 410 is a communication means for communicating with an external device and connecting to an external network. The output unit 420 is a display that displays results of processing by the processor 430. The input unit 440 is an input means for receiving a user's command and forwarding the same to the processor 430.

The processor 430 refers to graphic processing units (GPUs) and a central processing unit (CPU) for executing the networks constituting the image segmentation system shown in FIG. 1. The storage unit 450 provides a storage space necessary for operating the processor 430 and performing functions.

6. Variations

The image segmentation system for training the semantic segmentation network by utilizing the GAN architecture has been described with reference to preferred embodiments.

Embodiments of the present disclosure suggest a method for implementing a generator of a GAN as a semantic segmentation network for segmenting regions in an image, instead of a network for generating images, for allowing a discriminator of the GAN to receive a result of image segmentation of the semantic segmentation network, and a GT, and to discriminate between them, and for training the semantic segmentation network based on performance of the discriminator and performance of the semantic segmentation network.

Accordingly, accuracy of image segmentation can be enhanced, and particularly, exact segmentation is possible for a precise image.

In the above-described embodiments, the aviation image (FIG. 7) and the satellite image (FIG. 8) are segmented to evaluate performance. However, this is merely an example, and the method and the system according to embodiments may be widely applied to image segmentations of other images including medical images, CCTV images, front images of autonomous vehicles as well as aviation images and satellite images.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A method for training an image segmentation network, the method comprising:
   inputting an image to a first network which is trained to output a region segmentation result regarding an input image, and generating a region segmentation result; and
   inputting the region segmentation result generated at the generation step and a ground truth (GT) semantic mask to a second network, and acquiring a discrimination result, the second network being trained to discriminate inputted region segmentation results as a result generated by the first network and a GT semantic mask, respectively;
   training the first network by using the discrimination result; and
   training the second network by using the discrimination result.

2. The method of claim 1, wherein the first network is trained by using a loss function comprising discrimination performance of the second network.

3. The method of claim 2, wherein the first network is trained by using the loss function further comprising segmentation performance of the first network.

4. The method of claim 3, wherein the segmentation performance of the first network is calculated by comparing the region segmentation result generated by the first network and the GT semantic mask.

5. The method of claim 3, wherein the first network is trained by using the loss function further comprising region segmentation image generation performance of the first network.

6. The method of claim 5, wherein the region segmentation image generation performance of the first network is calculated by comparing an input image to which the region segmentation result generated by the first network is added, and an input image to which the GT semantic mask is added.

7. The method of claim 5, wherein, in the loss function, respective weightings are applied to the discrimination performance of the second network, the segmentation performance of the first network, and the region segmentation image generation performance of the first network.

8. The method of claim 1, wherein the second network is trained by using a loss function comprising discrimination performance of the second network.

9. The method of claim 1, wherein the region segmentation result is a semantic mask.

10. A system for training an image segmentation network, the system comprising:
    a processor configured to:
       input an image to a first network which is trained to output a region segmentation result regarding an input image, and generate a region segmentation result; and
       input the region segmentation result generated by the first generator and a GT semantic mask to a second network, and acquire a discrimination result, the second network being trained to discriminate inputted region segmentation results as a result generated by the first network and a GT semantic mask, respectively; and
       train the first network and the second network by using the discrimination result; and
    a storage unit configured to provide a necessary storage space to the processor.

11. An image segmentation method comprising:
    receiving an input of an image; and
    generating a region segmentation result regarding the image inputted at the input step by using a first network,
    wherein the first network is trained to output a region segmentation result regarding an input image when an image is inputted, and discrimination performance of a second network is used for training of the first network,
    wherein the second network is trained to discriminate inputted region segmentation results as a result generated by the first network and a GT semantic mask, respectively, when the region segmentation results are inputted.

* * * * *